A. McLEAN.
BED RAIL NOTCHING MACHINE.
APPLICATION FILED MAR. 29, 1909.

934,090.

Patented Sept. 14, 1909.
2 SHEETS—SHEET 1.

WITNESSES
J.M.Walstrom
J.M.Sullivan

INVENTOR
ANGUS McLEAN
BY Paul & Paul
HIS ATTORNEYS

A. McLEAN.
BED RAIL NOTCHING MACHINE.
APPLICATION FILED MAR. 29, 1909.
934,090.
Patented Sept. 14, 1909.
2 SHEETS—SHEET 2.
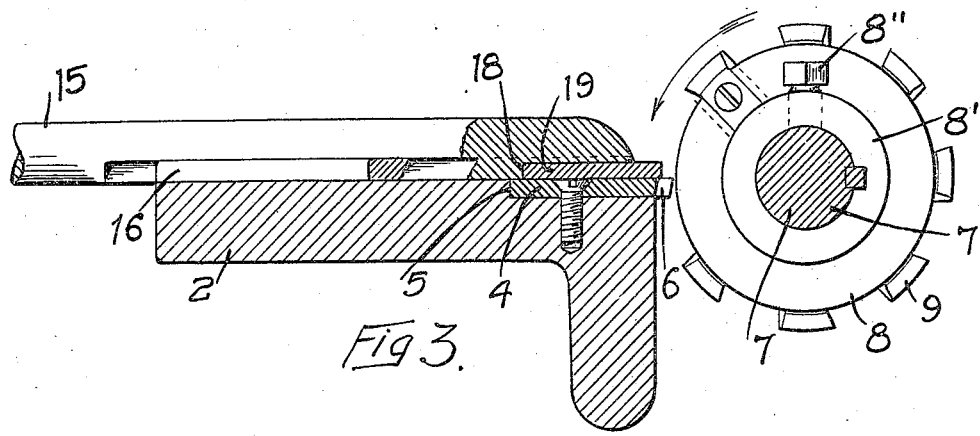
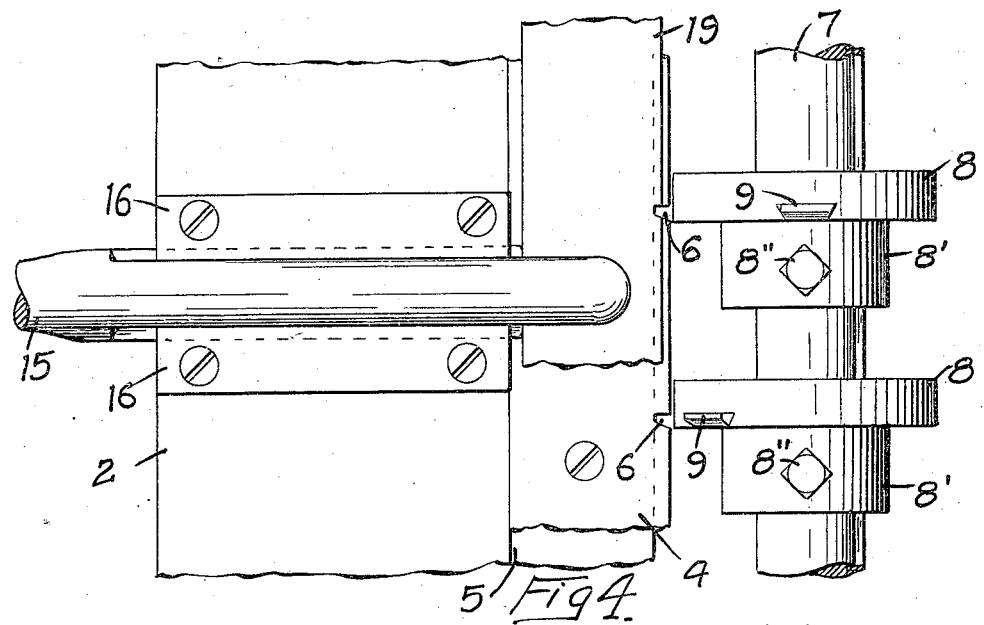
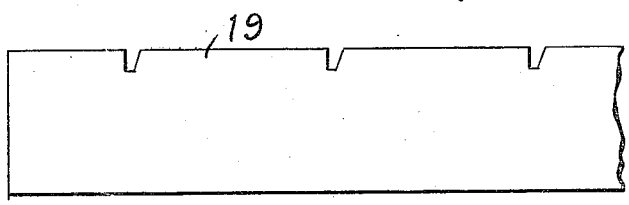
WITNESSES
A. M. Wahlstrom
J. M. Sullivan
INVENTOR
ANGUS McLEAN
BY Paul & Paul
HIS ATTORNEYS

UNITED STATES PATENT OFFICE.

ANGUS McLEAN, OF MINNEAPOLIS, MINNESOTA.

BED-RAIL-NOTCHING MACHINE.

934,090.

Specification of Letters Patent. Patented Sept. 14, 1909.

Application filed March 29, 1909. Serial No. 486,445.

*To all whom it may concern:*

Be it known that I, ANGUS McLEAN, of Minneapolis, Hennepin county, Minnesota, have invented certain new and useful Improvements in Bed-Rail-Notching Machines, of which the following is a specification.

In the manufacture of beds and couches using a spring fabric, it is customary to provide notched bars for holding the wires apart and in parallel relation with one another. These notches have generally been cut by hand and the operation required considerable time and labor.

The object of my invention is to provide a machine equipped with a series of cutters operated successively to cut notches of the required depth in the edge of the bar, as the cutters revolve.

My invention consists generally in various constructions and combinations, all as hereinafter described and particularly pointed out in the claims.

Figure 1:
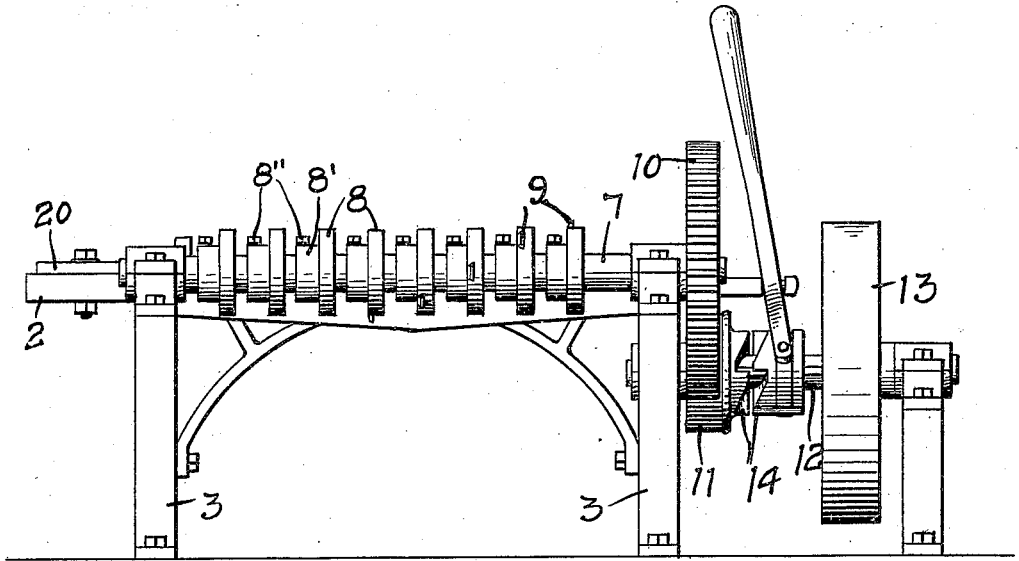
Figure 2:
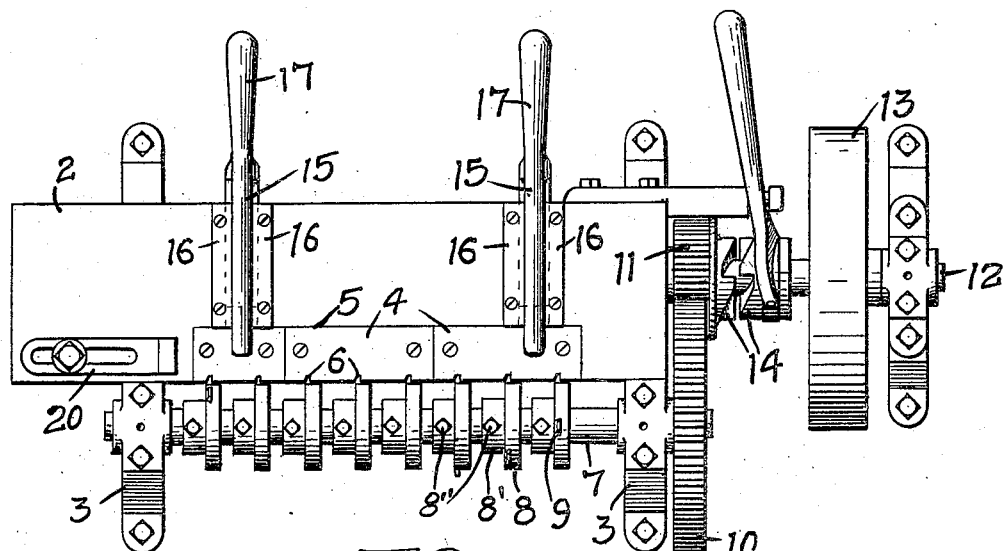

In the accompanying drawings, forming part of this specification, Figure 1 is a side elevation of a machine, embodying my invention, Fig. 2 is a plan view, Fig. 3 is a transverse sectional view, illustrating the manner of placing the bars on the bed or frame of the machine, Fig. 4 is a detail view, showing the relative arrangement of the bar to be notched and the cutter disks, Fig. 5 is a detail view, showing a portion of one of the notched bars.

In the drawing, 2 represents a table or bed, supported upon legs 3 and having a plate 4 secured within a recess 5 and provided with a series of notches 6. A shaft 7 is arranged to revolve near said plate and carries a series of disks 8, upon which cutter blades 9 are mounted. There may be any desired number of these disks, according to the length of the bar to be notched. Each disk is splined on the shaft 7 and has a hub 8' secured to the shaft by a set screw 8''. Upon loosening this screw, a disk may be adjusted on this shaft to increase or decrease the distance of the disk, according to the desired spacing of the notches. The cutter blades are arranged on the disks, so that they will engage the bar to be notched successively and thus relieve the mechanism of unnecessary jar and shock, which might follow from the simultaneous engagement of the cutter blades with the bar. A gear 10 is mounted on the shaft 7 and meshes with a gear 11 on a shaft 12, which is provided with a driving pulley 13 and a clutch mechanism 14, by means of which the power is transmitted to the drive shaft 7. Upon the table 2, I provide slides 15 arranged to operate longitudinally in guides 16 and having handles 17. The inner ends of these slides have recesses 18 therein, to receive a bar 19 that is placed upon the plate 4. A gage 20 is mounted on the table 2 and adjustable lengthwise thereon and the operator, in arranging the bar 19 on the plate, will adjust it in contact with the gage 20, so that the edge of the bar to be notched will be in the rear of the notches 6 in the plate 4. The cutters are then set in motion and by means of the slides 15, the bar 19 is pushed into the path of the cutters and held during the notching operation. As soon as the bar has been notched, which will be accomplished with one revolution of the cutter disks, the slides may be withdrawn, the bar removed and another one substituted therefor.

I claim as my invention:—

1. In a machine of the class described, the combination, with a table, of a plate mounted thereon and having notches in one of its edges at intervals, and said notched edge projecting beyond the edge of the table, said plate being removable to allow the substitution of another plate with differently spaced notches, a shaft arranged parallel with said plate, a series of disks secured thereon and adjustable lengthwise on said shaft to adapt them to the distance between the notches in said plate, a series of cutter blades carried by said disks and arranged to sweep through the notches in said plate, and means for feeding and holding a plate to be notched into the path of said cutter blades, substantially as described.

2. In a machine of the class described, the combination, with a table having a recess therein, of a plate fitting within said recess and having a notched edge projecting beyond the edge of the table, the top of said plate being flush substantially with the top of said table, a shaft arranged parallel with said plate, a series of cutters mounted thereon and adapted to sweep through the notches in the edge of said plate, means for feeding a plate to be notched over said first-named plate into the path of said cutters, said feeding means including slides, operating in guides on the table top and having suitable handles and provided with recessed inner ends which are adapted to receive the plate to be notched, the ends of the slides projecting over the plate to be notched and holding it during the notching operation, substantially as described.

In witness whereof, I have hereunto set my hand this 25th day of March 1909.

ANGUS McLEAN.

Witnesses:
J. A. BYINGTON,
C. G. HANSON.